(12) United States Patent
Takano et al.

(10) Patent No.: US 11,209,599 B2
(45) Date of Patent: Dec. 28, 2021

(54) INGRESS PROTECTED, OUTDOOR RATED ADAPTER AND METHOD OF ASSEMBLY TO AN OUTDOOR CONNECTOR

(71) Applicant: Senko Advanced Components Inc, Marlborough, MA (US)

(72) Inventors: Kazuyoshi Takano, Tokyo (JP); Jeffrey Gniadek, Oxford, ME (US)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/271,012

(22) Filed: Feb. 8, 2019

(65) Prior Publication Data

US 2020/0012050 A1 Jan. 9, 2020

Related U.S. Application Data

(60) Provisional application No. 62/694,114, filed on Jul. 5, 2018.

(51) Int. Cl.
*G02B 6/38* (2006.01)
*G02B 6/40* (2006.01)

(52) U.S. Cl.
CPC ......... *G02B 6/3825* (2013.01); *G02B 6/3887* (2013.01); *G02B 6/3889* (2013.01); *G02B 6/3894* (2013.01); *G02B 6/406* (2013.01); *G02B 6/3849* (2013.01)

(58) Field of Classification Search
None
See application file for complete search history.

(56) References Cited

U.S. PATENT DOCUMENTS

| 5,796,898 | A | 8/1998 | Lee | |
| 2006/0045430 | A1 | 3/2006 | Theuerkorn et al. | |
| 2008/0175541 | A1* | 7/2008 | Lu | G02B 6/3816 |
| | | | | 385/62 |
| 2009/0148101 | A1 | 6/2009 | Lu et al. | |
| 2015/0260936 | A1 | 9/2015 | Newbury et al. | |
| 2015/0338584 | A1 | 11/2015 | Islam | |
| 2016/0154184 | A1* | 6/2016 | Bund | G02B 6/3897 |
| | | | | 385/78 |
| 2016/0186792 | A1 | 6/2016 | Valencia | |
| 2016/0291260 | A1* | 10/2016 | Busse | G02B 6/3826 |
| 2016/0320572 | A1 | 11/2016 | Gniadek | |
| 2017/0031108 | A1* | 2/2017 | Gniadek | G02B 6/3891 |
| 2017/0235060 | A1* | 8/2017 | Coenegracht | G02B 6/3825 |
| | | | | 385/60 |
| 2017/0336577 | A1 | 11/2017 | Kaplan | |

OTHER PUBLICATIONS

International Search Report and Written Opinion, Application No. PCT/US19/40700, dated Sep. 27, 2019, pp. 12.

* cited by examiner

*Primary Examiner* — Michelle R Connelly

(57) ABSTRACT

An outdoor rated ingress protected one-piece adapter with a first and second end. First end accepts a fiber optic adapter configured to accept a LC, SN, CS, SC or MPO fiber ferrule assembly. A second end accepts a cable gland assembly that secures a cable therein. The first end is configured to accept an outdoor rated connector having a fiber connector therein. The connector/adapter assembly is rated for outdoor use.

5 Claims, 18 Drawing Sheets

FIG. 8  Prior Art Connector

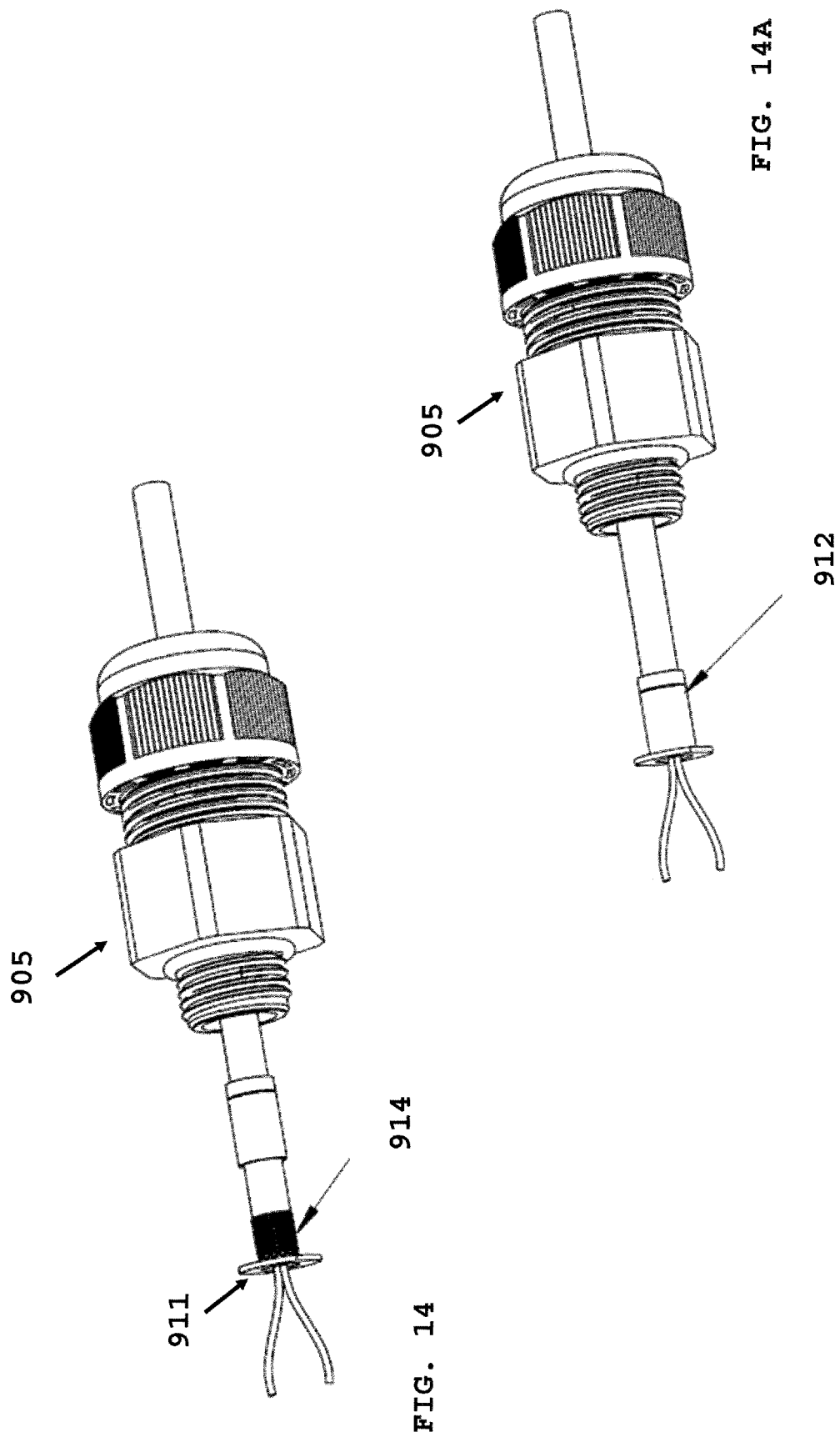

INGRESS PROTECTED, OUTDOOR RATED ADAPTER AND METHOD OF ASSEMBLY TO AN OUTDOOR CONNECTOR

CROSS REFERENCE TO RELATED APPLICATIONS

This application claims priority to U.S. provisional application 62/694,114 filed on Jul. 5, 2018.

FIELD OF THE INVENTION

The present disclosure relates generally to fiber optic connectors and systems, and specifically to ultra-slender optical fiber adapters ingress protected from moisture and debris. The adapter further comprises an in-line adapter within its housing. The in-line adapter accepts a SC, SN, CS, LC or MPO fiber optic connector.

BACKGROUND

The reliability of communication infrastructure depends on secure connections between components, such as cable segments, network equipment, and communication devices. Such connections are continually exposed to dust, dirt, moisture, and/or other contaminants that may infiltrate the connections and degrade performance or even sever the connection between components. Conventional connection assemblies, such as typical fiber optic connectors, are generally not capable of providing an adequate seal to fully prevent the ingress of unwanted fluids (for instance, water) or solid contaminants. Fiber optic network segments are particularly vulnerable because fiber optic connections require extremely precise termination and alignment between connected components and cable segments that may be disrupted by the presence of fluid or solid contaminants. As such, fiber optic network segments connected using conventional technology are very susceptible to performance and/or availability degradation over time. Accordingly, telecommunication network providers would benefit from a connection assembly capable of maintaining a sealable and secure connection configured to prevent the ingress of unwanted materials into the connection assembly with an in-line adapter with reduced number of parts.

BRIEF DESCRIPTION OF THE DRAWINGS

FIG. 14 is a perspective view of FIG. 13A with strength members on back post.

FIG. 14A is FIG. 14 with crimp ring over back post.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

An adapter is a device with one or more openings configured to accept a connector. An adapter further comprises a housing, and one or more locking mechanism external or internal to the housing. An internal lock may secure a connector within an opening, and an external lock may secure adapter assembly, the latter including connectors, to a panel using a locking nut. A connector is inserted and secured at either end of adapter, for example, a ferrule connector (FC), a fiber distributed data interface (FDDI) connector, an LC connector, a mechanical transfer (MT) connector, a square connector (SC) connector, an SC duplex connector, or a straight tip (ST) connector. The connector may generally be defined by a connector housing body, an external latch or recess to secure said connector into adapter opening and one or more ferrules having optic fibers therein. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Figure 1:
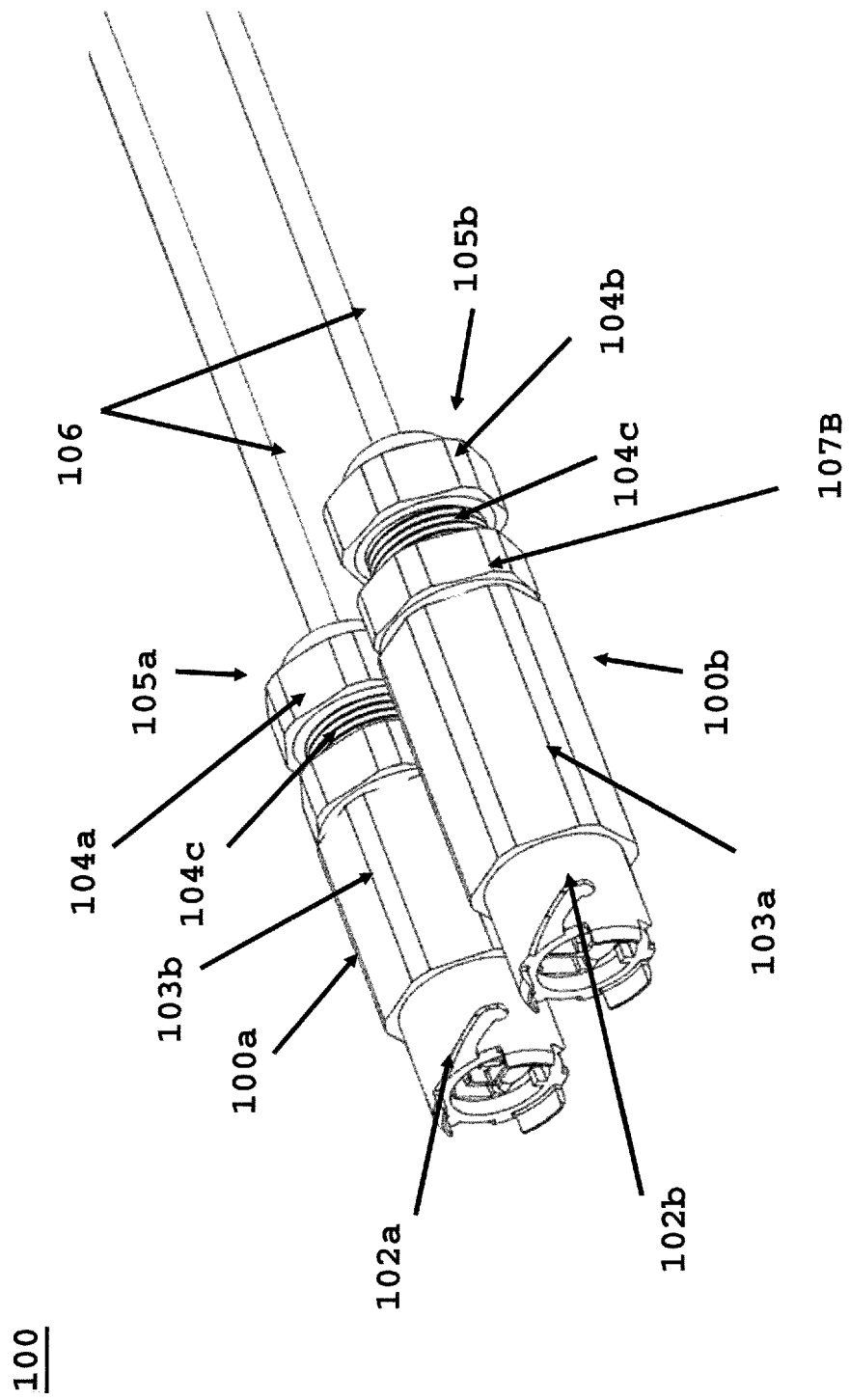
FIG. 1 is a perspective view of the present invention ingress protected adapters with a cable gland assembly.
Figure 3:
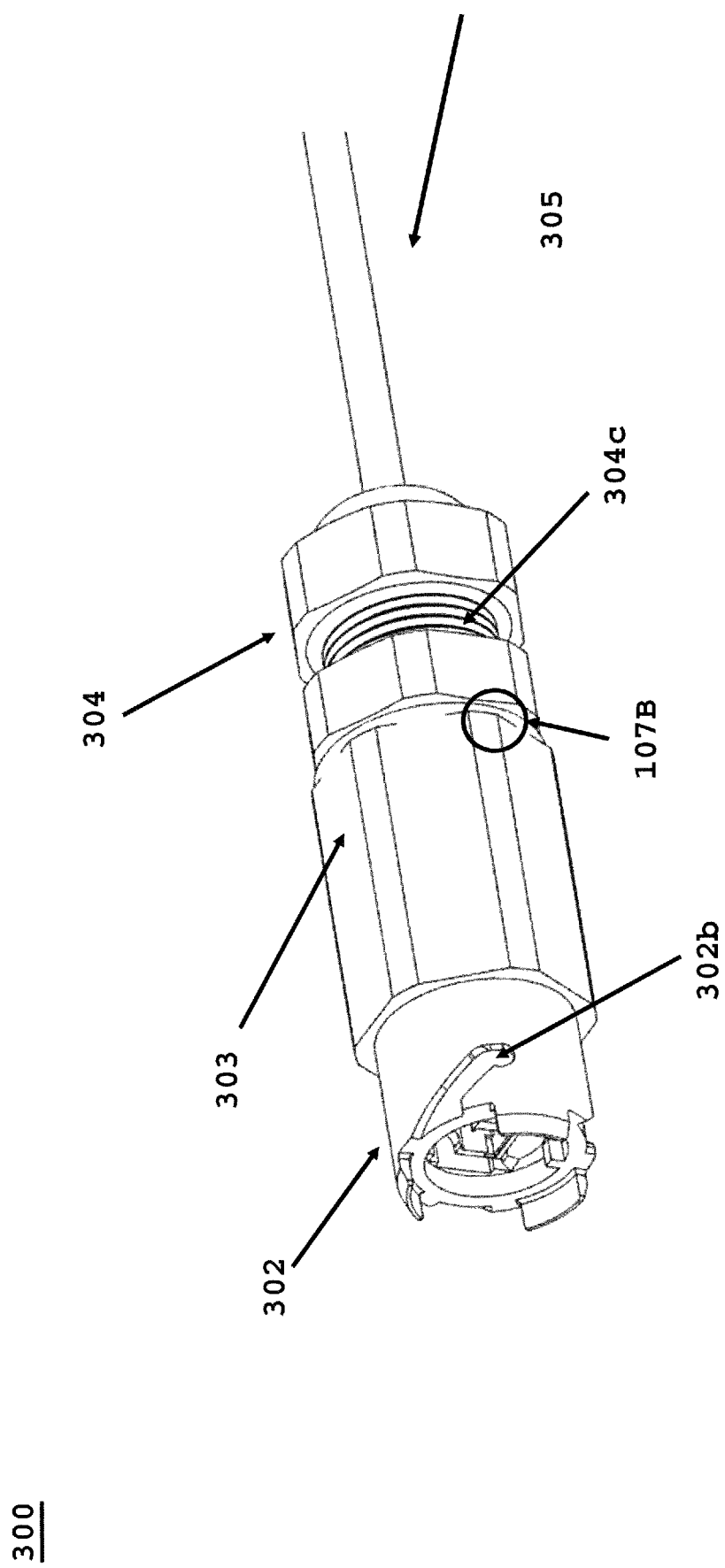
FIG. 3 is a perspective view of one-piece adapter according to the present invention.

FIG. 1 depicts a pair of outdoor rated, ingress protected adapters (100a, 100b) according to the present invention. Adapters (100a, 100b) further comprises a front portion for attaching to a female outdoor connector. Front portion (102a, 102b) has a bayonet type locking groove (402b) at a proximal end of one-piece adapter (100a, 100b) body (103a, 103b). One-piece adapter body (103) has a cable gland assembly (105a, 105b) at a second end of body (103). Cable gland assembly (105) has a cable gland nut (104a, 104b) with a treaded body portion (104c) at proximal end. The cable glade nut (304) threads into adapter body (103) at a distal end forming an environmental seal. Cable (106) with at least two optical fibers (913) (refer to FIG. 9), surrounded by a cable jacket is compressed by cable gland assembly (105) (Refer to FIG. 10), thereby securing cable against pull forces in direction of A' (FIG. 9), and disconnecting optical fibers from adapter (909). One-piece adapter (100a, 100b) has a cable gland assembly (105a, 105b). Removable cable gland assembly (107A) may be a separate piece, as depicted in FIG. 10, or is integrally molded (107B) to the distal end of the one-piece adapter body (103), as shown in FIG. 3.

Figure 2:
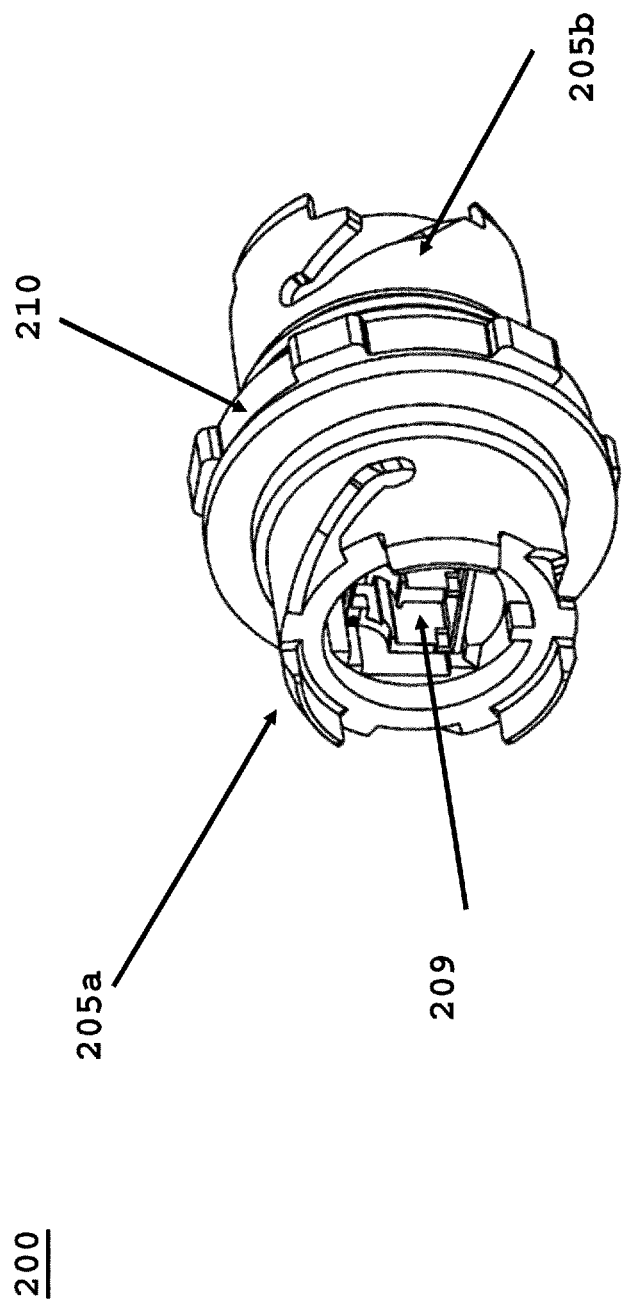
FIG. 2 is a perspective view of a prior art adapter.
Figure 8:
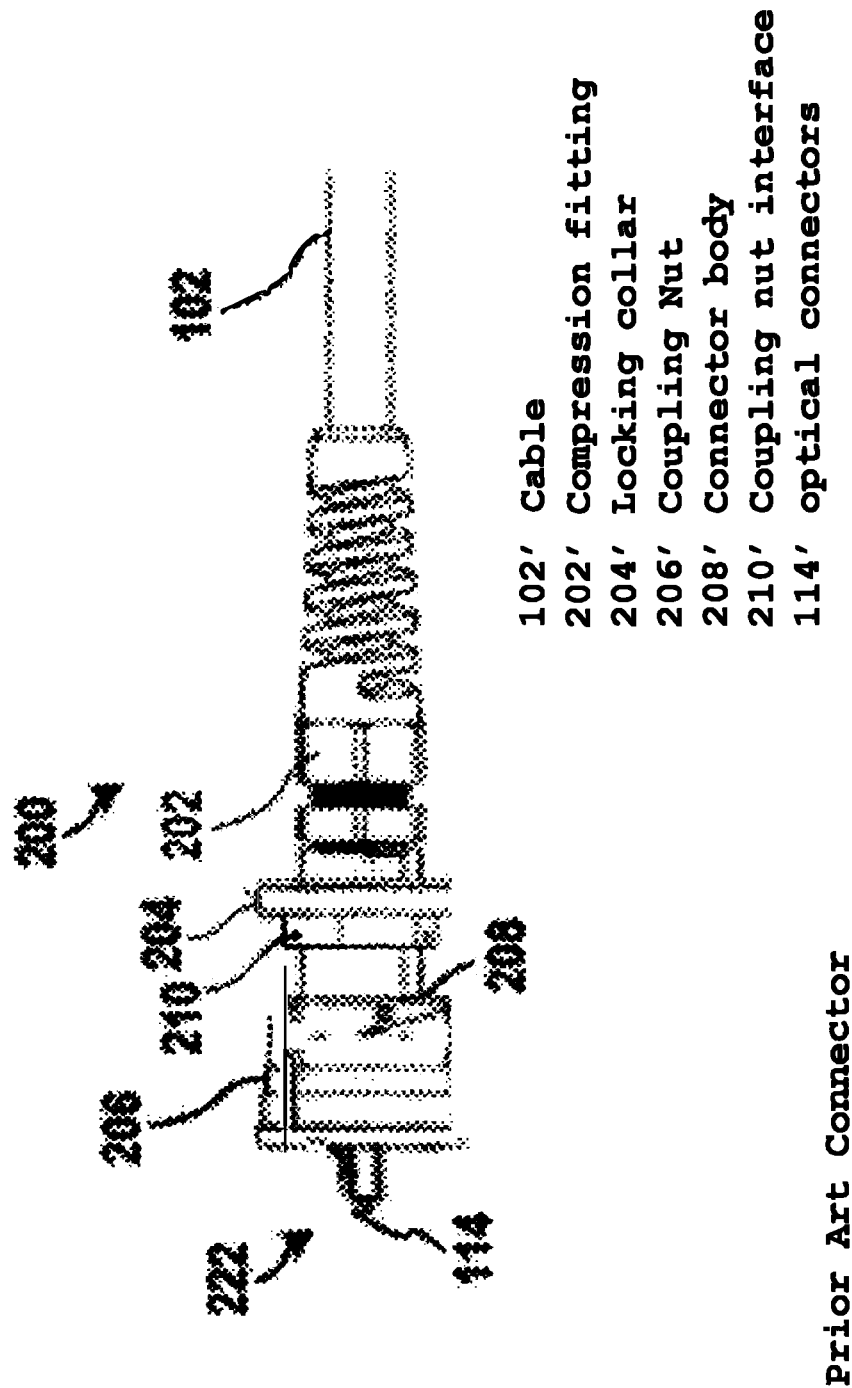
FIG. 8 is perspective view of a prior art outdoor connector with at least one fiber optic connector therein.

Comparing with FIG. 8, FIG. 1 has a reduced number of components to assembly and provides a more compact adapter assembly over the FIG. 8 prior art device. FIG. 8 connector is found in Gniadek U.S. Pat. No. 9,477,049 commonly assigned with the present invention. FIG. 2 is a prior art micro hybrid adapter with opposing receptacles configured to accept an outdoor connector (250a, 250b) as depicted in FIG. 2A, and disclosed in Takano US 20170219779A1 commonly assigned with the present invention.

FIG. 2 depicts a prior art adapter with a proximal and distal bayonet type locking groove adapter (205a, 205b), and a fiber optic adapter (209) inserted within adapter housing formed in part by a coupling nut (210).

Figure 2A:
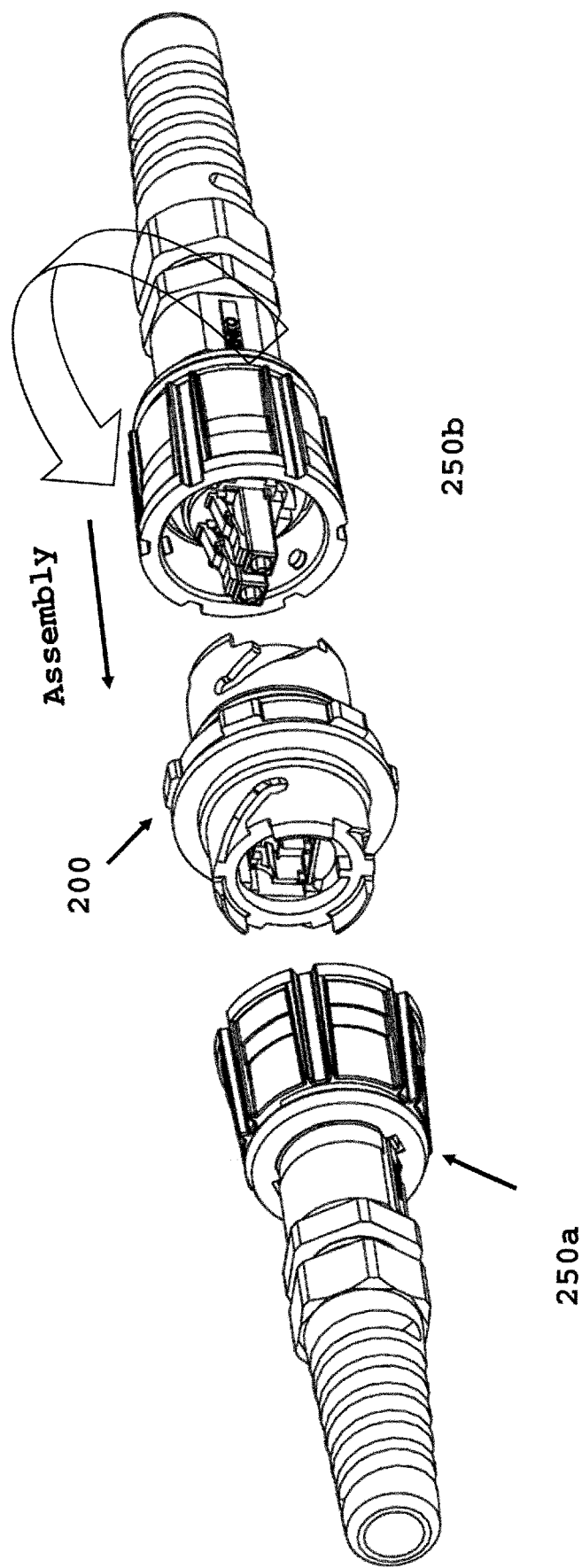
FIG. 2A is a perspective view of the adapter of FIG. 2 accepting two prior art outdoor connectors.

FIG. 2A depicts a prior art adapter (200) accepting a prior art outdoor connector (250a) at a proximal end of adapter (200) and a second outdoor connector (250b) at a distal end of adapter (200). Comparing FIG. 1 with FIG. 3, the present invention is shorter and has less components with first or second outdoor connector eliminated. The improvement is a one-piece adapter with a cable gland assembly at a second end and a first end can accept and secure an outdoor connector (250). This eliminates the need for the second outdoor connector (250a or 250b), and further improves waterproofing or ingress protection when the cable gland assembly forms a water-tight, debris tight seal.

FIG. 3 depicts an assembled one-piece adapter (300). Adapter (300) has a body (303) molded as one-piece with a removable cable gland assembly (107A) (refer to FIG. 1 at cable gland (107B)). Cable gland nut (304) compress cable (106) and seals adapter (300) from environmental ingress at the distal end of adapter. A seal is formed between the cable gland nut threads (304c) and inner corresponding grooves/threads of the adapter body (100). Adapter front portion (302) has a locking groove (302b) that accepts a locking pin (252b) (refer to FIG. 3A), to secure outdoor connector (250) to adapter front portion (302).

Figure 3A:
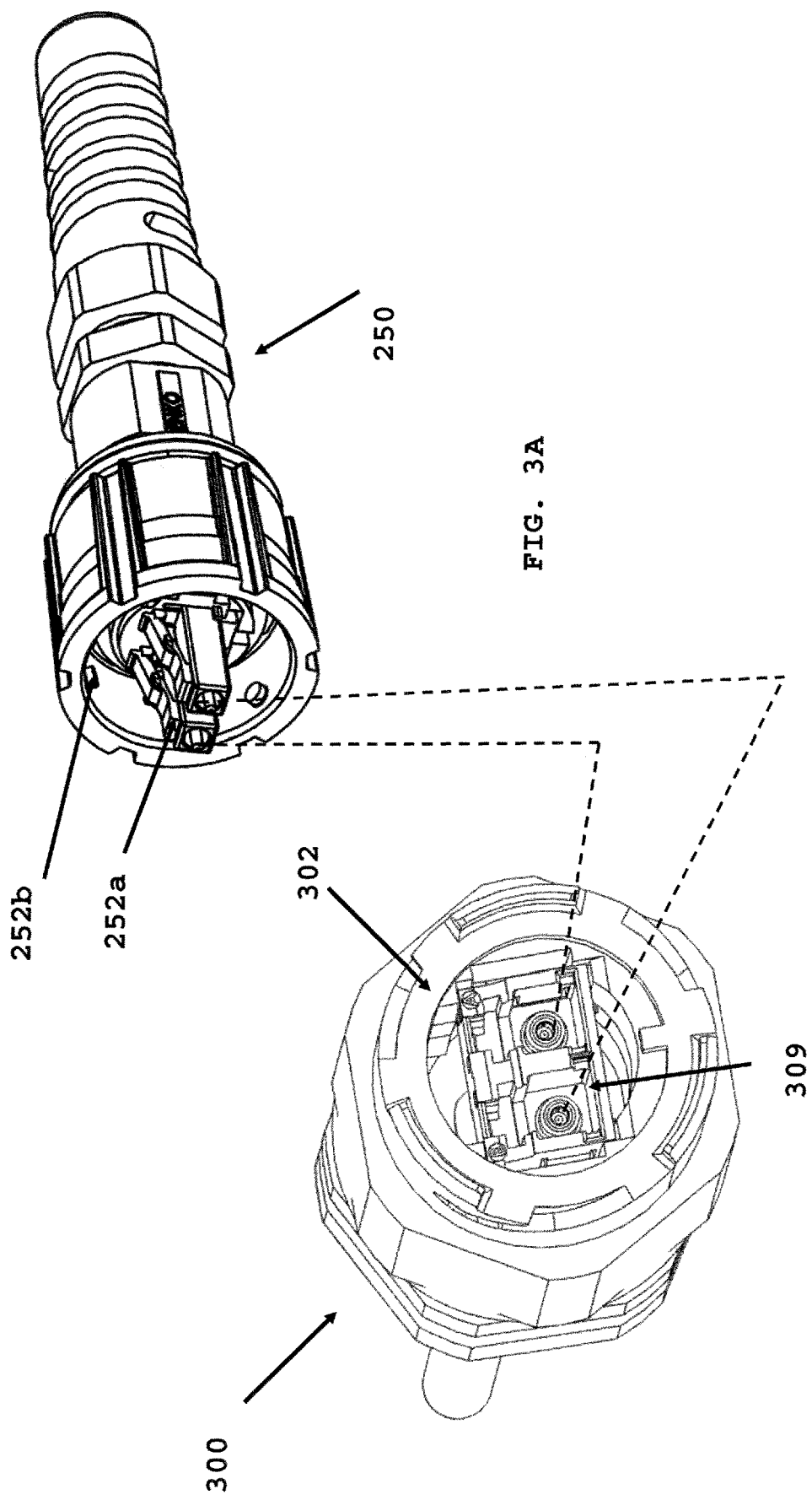
FIG. 3A is an exploded view of assembling the outdoor connector of FIG. 2A with the one-piece adapter of FIG. 3.

FIG. 3A is an exploded view of outdoor connector (250) just prior to securing connector (250) to adapter (300) front portion (302). Outdoor connector (250) has at least one fiber optic connector (252a) that mates with adapter (309), and upon mating a communication path is formed between optical fiber (913) and fiber optic connector. Dashed lines show the interconnection between fiber optic connectors within outdoor connector and fiber optic adapter contained within adapter (300) body (303).

Figure 4:
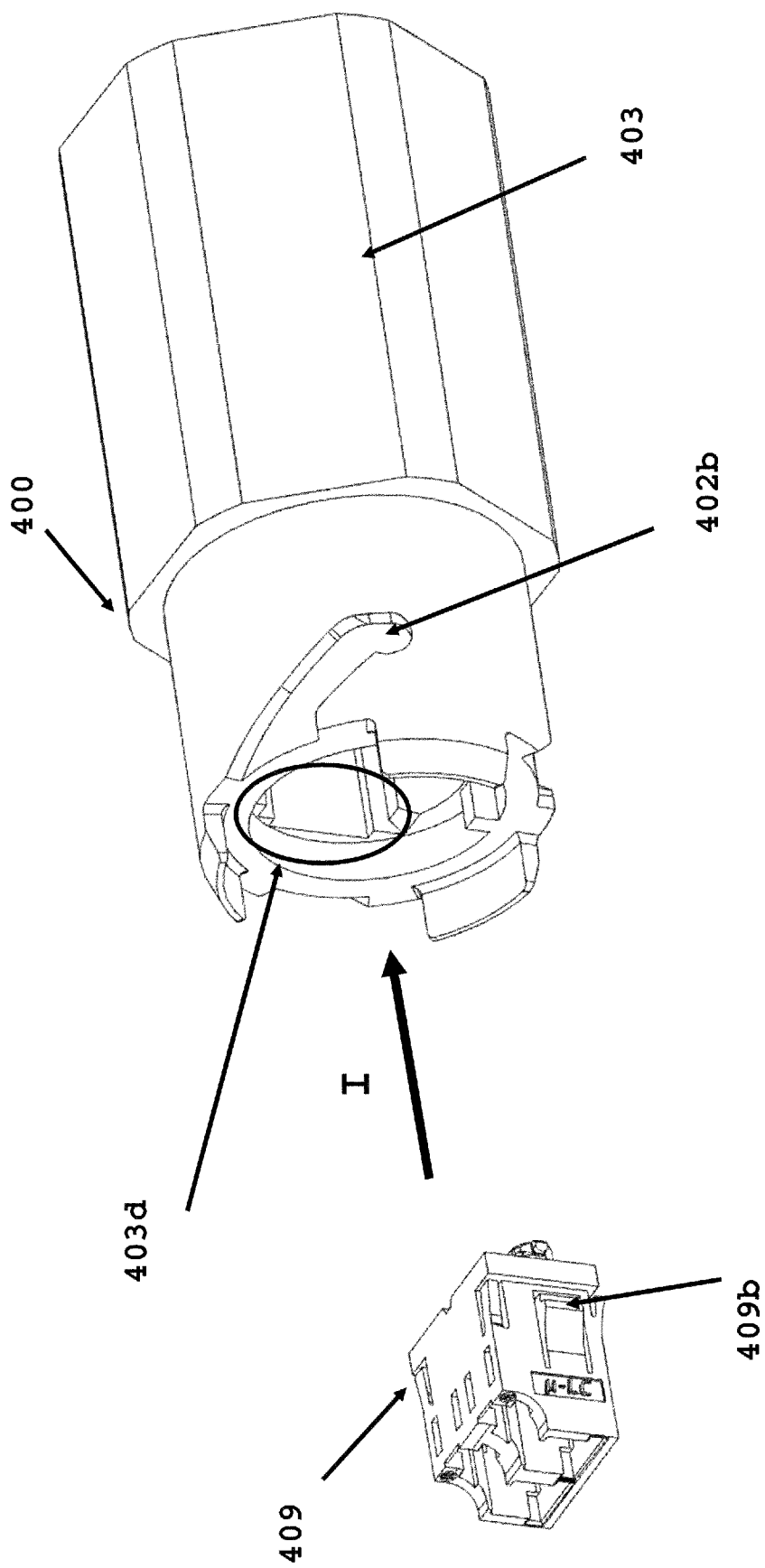
FIG. 4 is an exploded view of a fiber optic adapter prior to insertion into the one-piece adapter body.

FIG. 4 depicts one-piece adapter body (403) and fiber optic adapter (409) in an exploded view just prior to inserting adapter (409) into body (403) in direction of arrow "I".

Figure 11A:
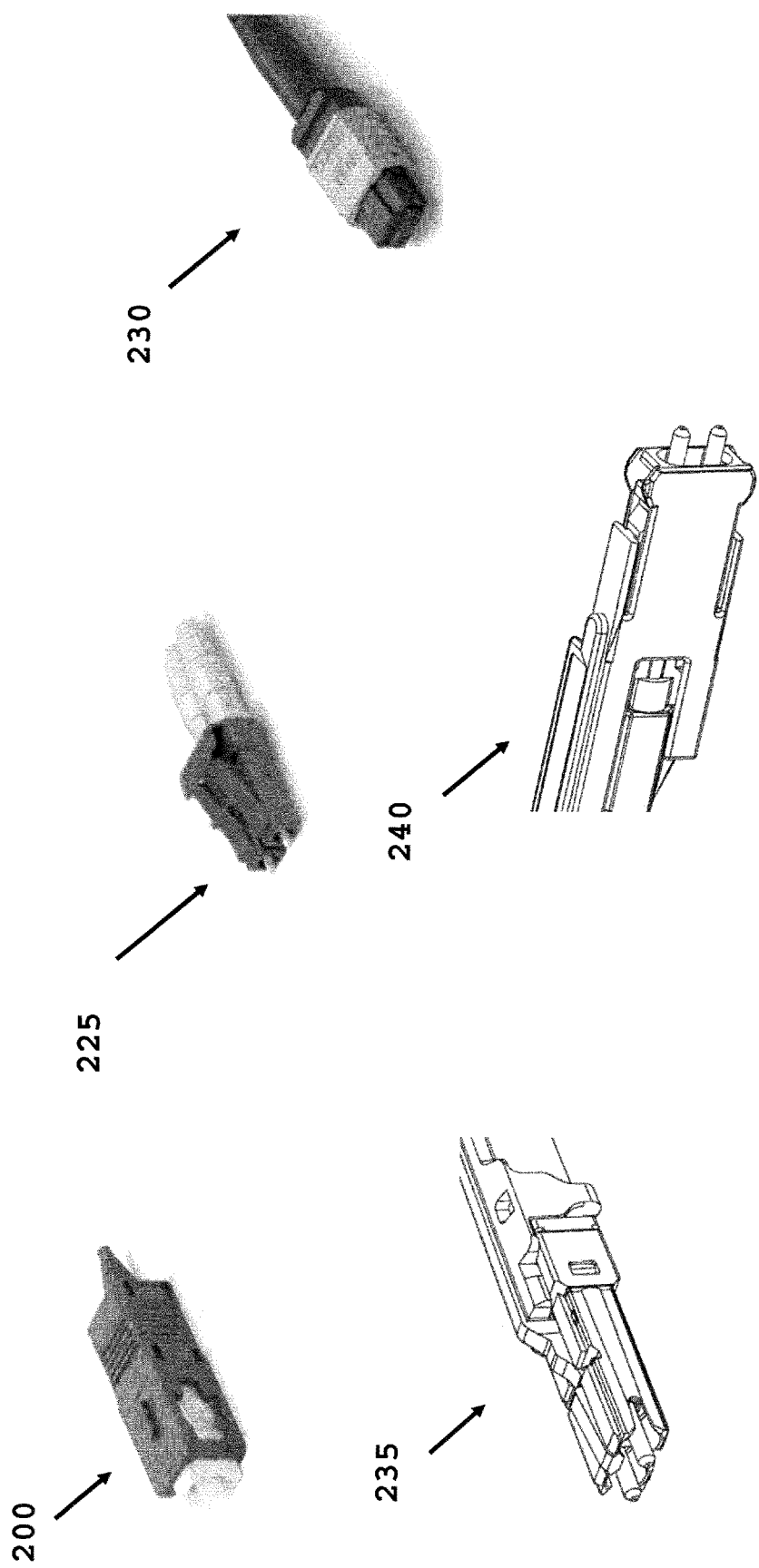
FIG. 11A is a perspective view of prior art fiber optic connectors.

Fiber optic adapter (409) accepts one or more fiber optic connectors, such as LC, SC or MPO connectors contained within an outdoor connector (250). Adapter (409) is secured with adapter body (403) by latch (409b) against receiving surface (403d). Locking groove (402b) accepts pin (252b) securing outdoor connector (250) to a proximal end of adapter (400). FIG. 11A depicts a number of prior art connectors that can be secured within outdoor connector, and the corresponding prior art adapters (FIG. 11B) that accept the prior art connectors.

Figure 5:
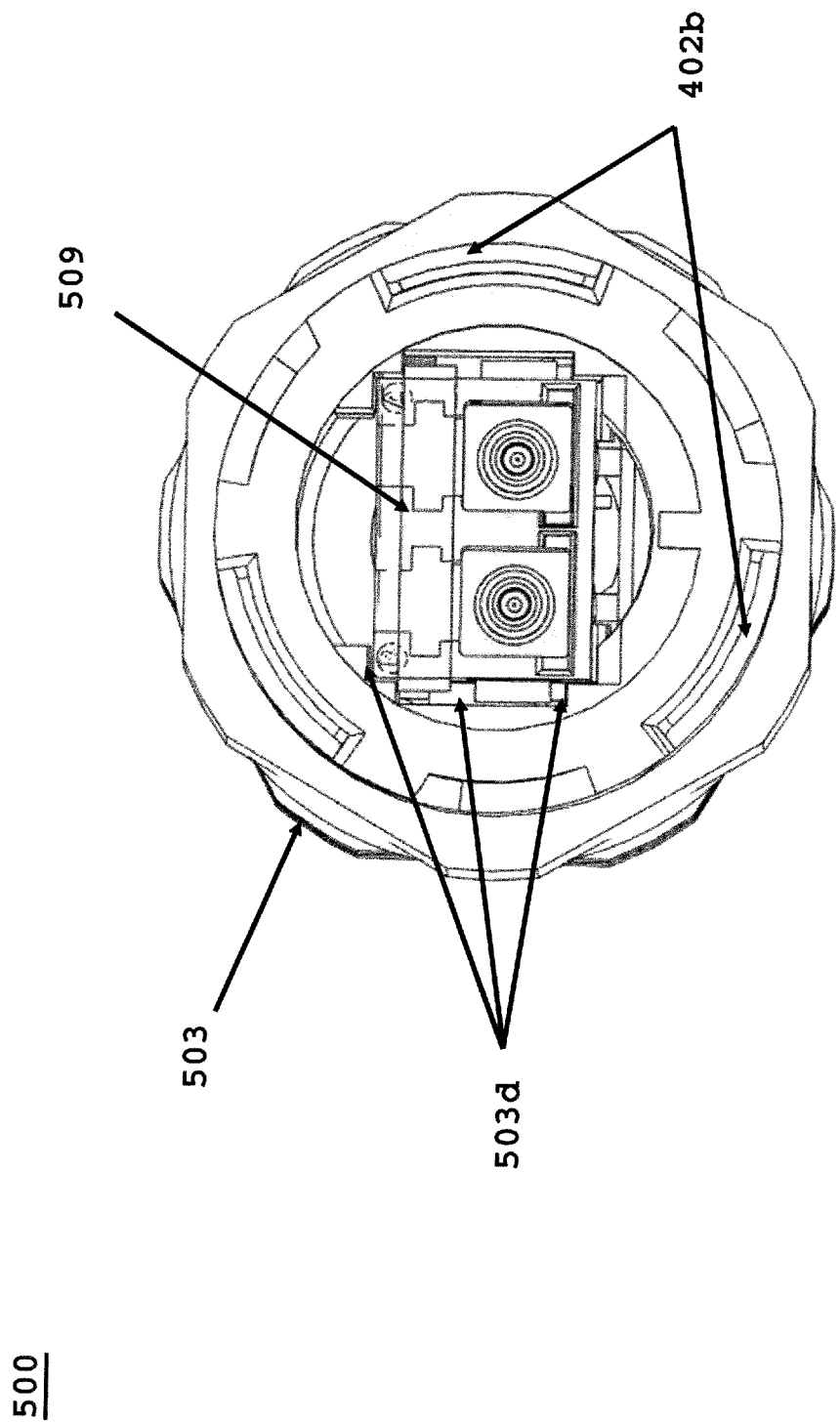
FIG. 5 is a front view of FIG. 4 with adapter fully inserted into one-piece adapter body.
Figure 6:
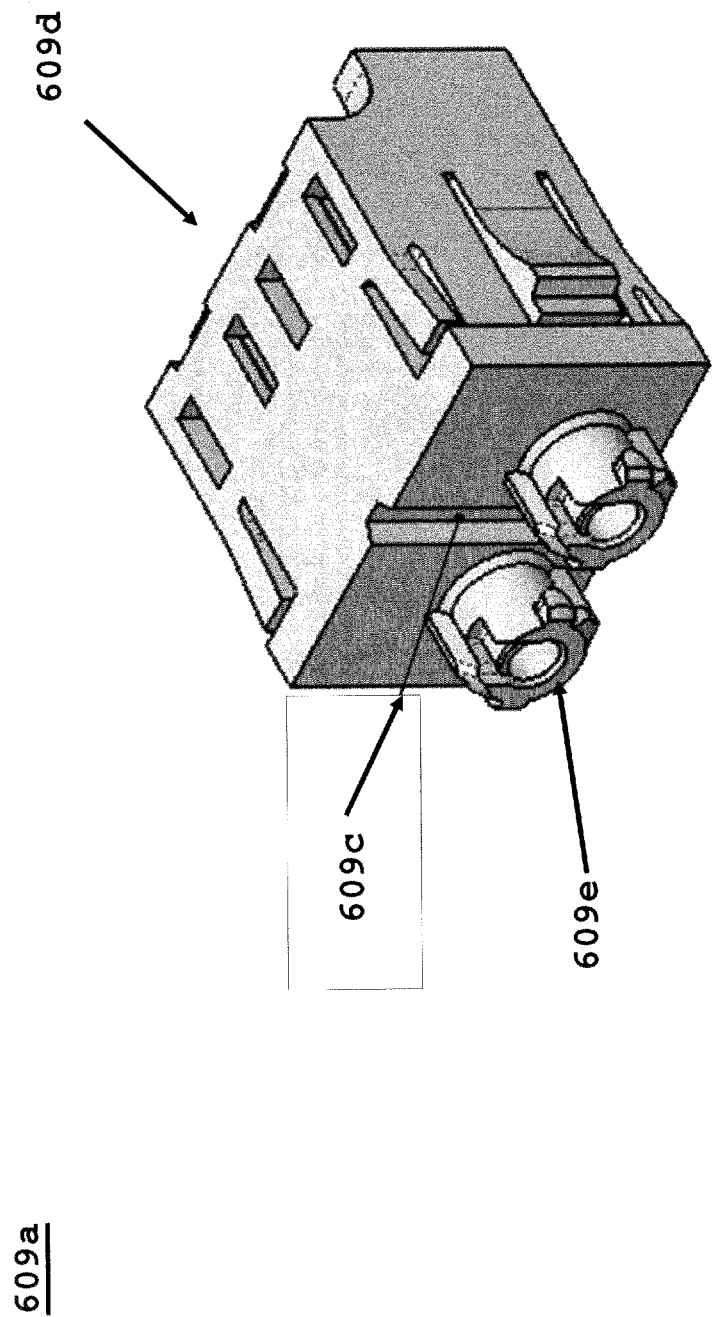
FIG. 6 is perspective view of a prior art in-line micro LC adapter.

FIG. 5 depicts a front view of one-piece adapter (500). A plural of locking grooves (402b) are formed on the adapter front portion. Adapter body (503) protects optical fibers and holds fiber optic adapter (509) selected from the prior art adapters of FIG. 11B. A plural of receiving surfaces (503d) align and secure adapter (509) within adapter body (503). FIG. 6 depicts a prior art fiber optic adapter (609a) for accepting a LC or SC connector within a first end (609d), cable/fiber stub (609e) to accept optical fibers at a second end, partitioned by groove (609c).

Figure 7:
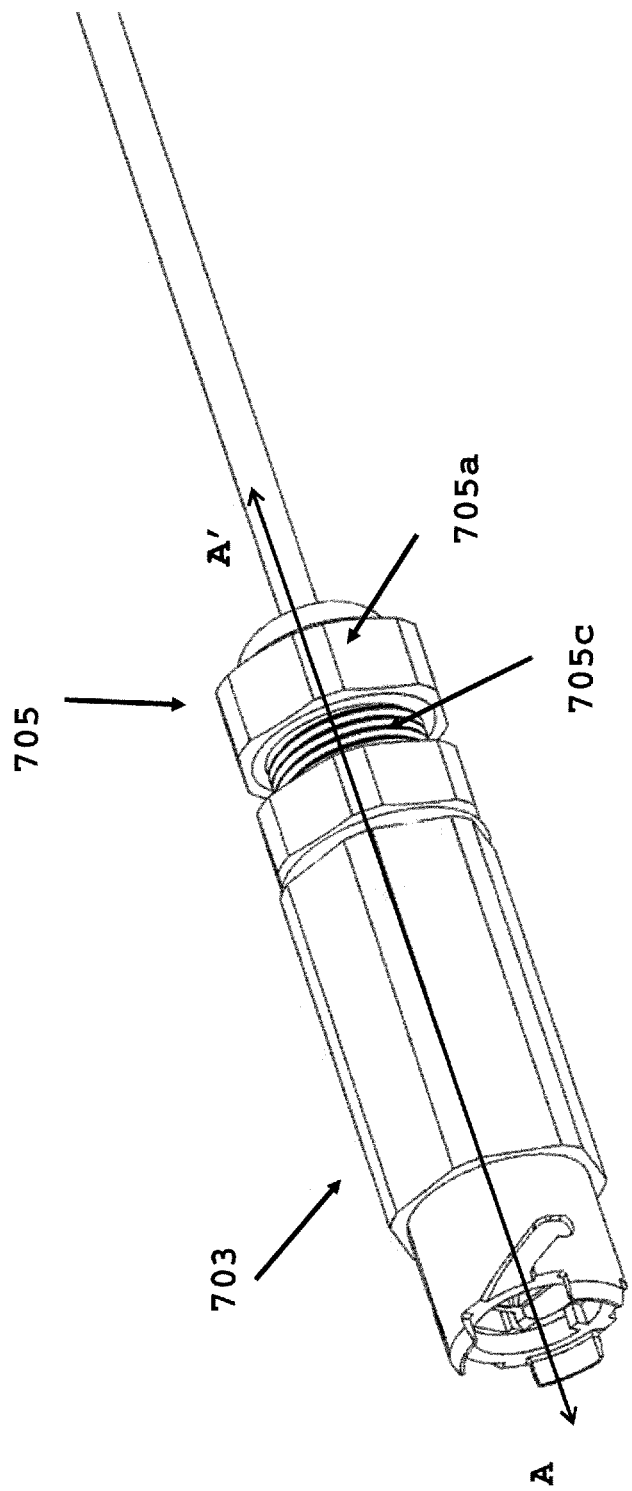
FIG. 7 is perspective view of the one-piece adapter of the present invention assembled in a longitudinal direction along A-A'.

FIG. 7 depicts an assembled view of the one-piece adapter (700) along longitudinal line A-A'. One-piece adapter body (703) further comprises the integrated cable gland assembly (705B) at a distal end of body (703). Cable gland assembly (705) further comprises a cable gland locking nut (705a) and nut thread (705c) for forming an environmental seal with body (703), and a cable gland locking nut (705a), which secures cable there through by compressing around the cable and further forms an environmental seal.

FIG. 8 depicts a prior art outdoor connector (200') similar to connector (250). Cable (102') is secured with compression fitting (202') at a distal end of connector (200'). Locking collar (204') and coupling nut interface (210') secure compression fitting (202') via coupling nut (206') to connector body (208') which forms outdoor connector (200'). Outdoor connector (200') has one or more optical connectors (114') within body (208').

Figure 9:
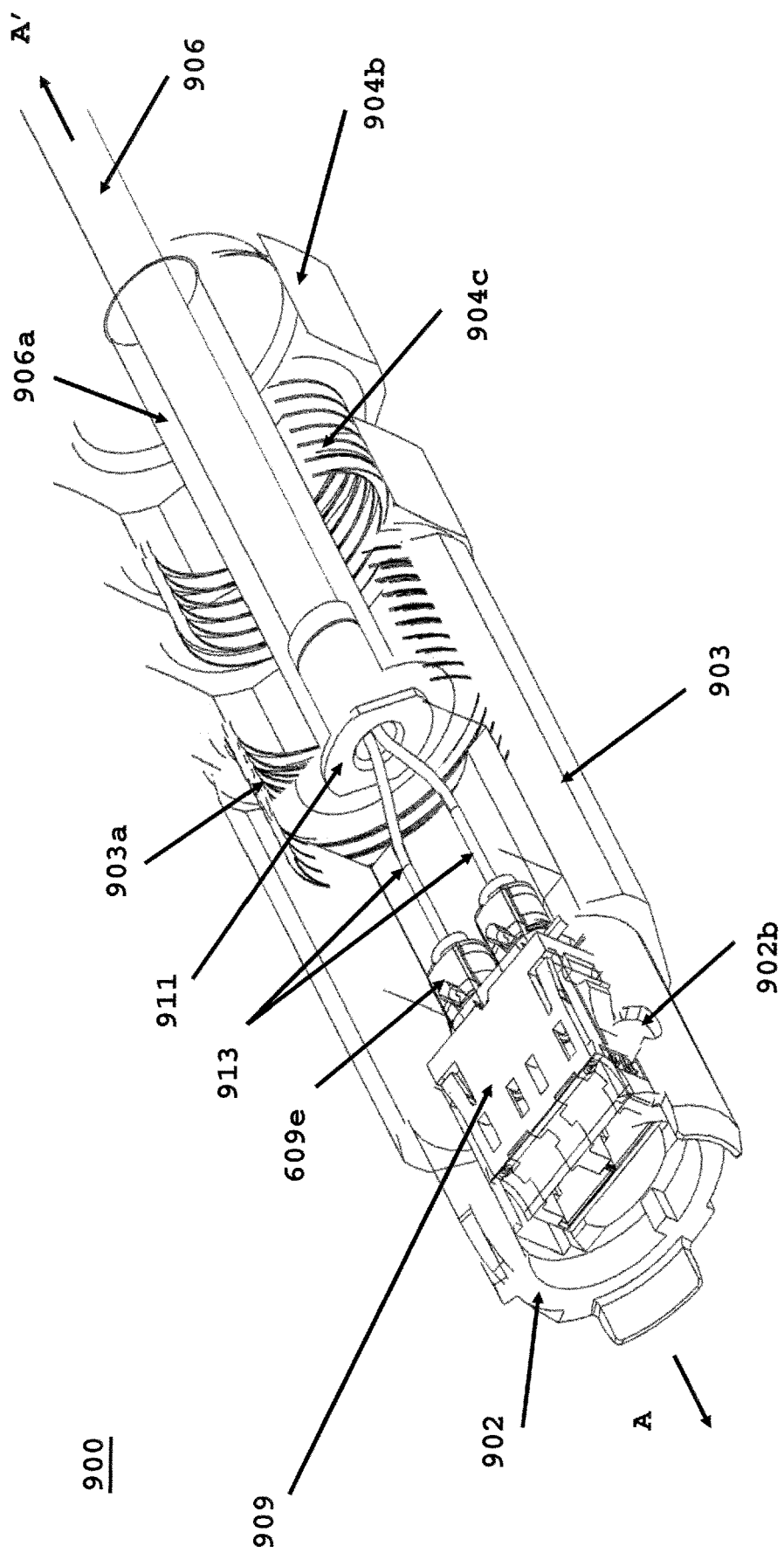
FIG. 9 is cut-away view along line A-A' depicting the internal structure of the adapter of the present invention.
Figure 10:
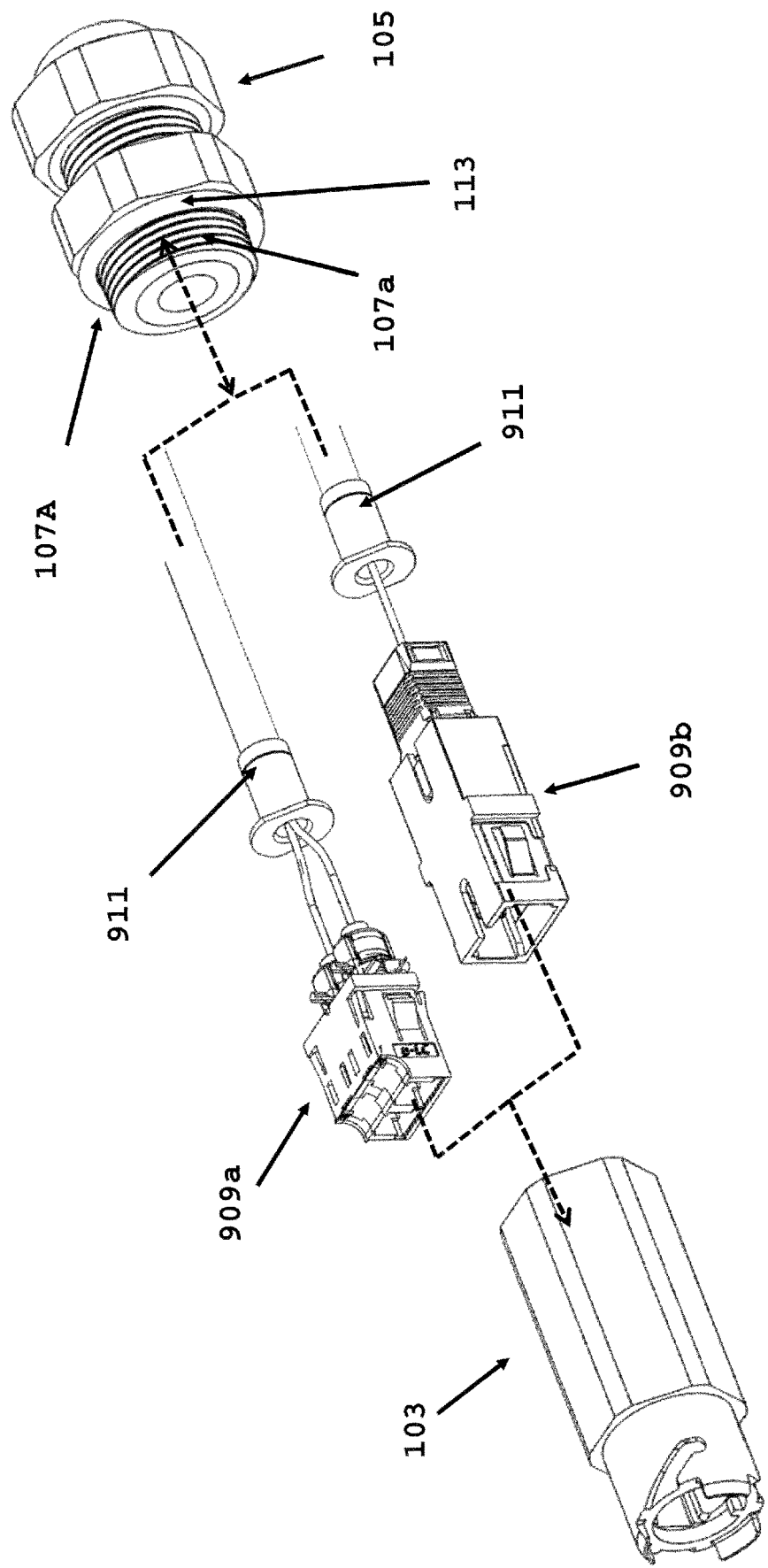
FIG. 10 is an exploded view of the adapter body of the present invention accepting a LC or SC adapter housing or a MPO adapter housing.

FIG. 9 depicts a cut-away view of one-piece adapter (900) along line A-A'. Protective sheathing (906a) about cable (906) holding optical fibers (913) provides additional environmental protection and helps ensure cable jacket is not puncture exposing optical fibers when cable gland nut (904b) is secured within body (903) via grooves (903a). Knurled back post (911) further secures cable (906) from being pulled out of distal end of adapter (900). Adapter (909) accepts fiber optic connectors (not shown) contained within an outdoor connector (250). Adapter front portion (902) has a locking groove (902b) that accepts a locking pin (252a) to secure outdoor connector (250) to the proximal end or front portion of adapter.

FIG. 10 depicts assembling the outdoor adapter (100) exploded with a LC/SC fiber optic adapter (909a) or a MPO fiber optic adapter (909b) secured within adapter body (103). Removable cable gland assembly (107A) is screwed into a distal end of one-piece adapter body (103). An environmental seal is formed with sealing ring (113) abutting inner wall of adapter body (103). Cable gland assembly (107A) has a threaded front end (107a) and a cable gland assembly (105) at a distal end. A sealing ring (113) is position on a face of the proximal end distal of the treads (107a).

FIG. 11A depicts standard fiber optic connectors used secured in connector (250) and accepted within by fiber optic adapter (909a) or fiber optic adapter (909b) secured with adapter body (103). A standard SC connector with optical fiber (200) or a standard duplex LC connector (225) are accepted by adapter (909a). A MPO connector (230) is accepted by adapter (909b). A CS® connector (235) is accepted by adapter (909a) and a SN™ connector (240) is accepted by adapter (909a). CS and SN are trademarks of the current assignee of this patent. The trademark names are for reference only.

Figure 11B:
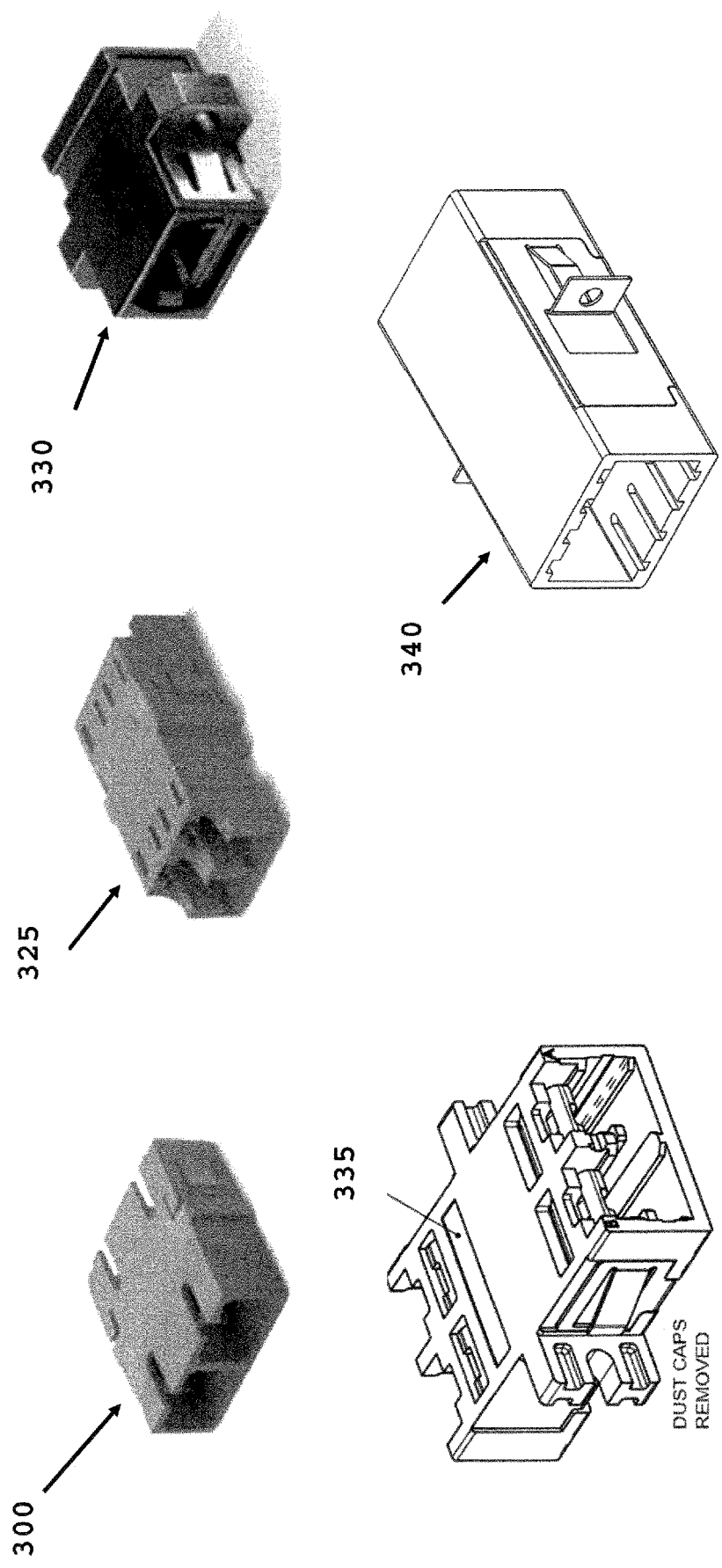
FIG. 11B is a perspective view of prior art fiber optic adapters configured to accept the connectors for FIG. 11A.

FIG. 11B depicts adapters used for fiber optic adapter (909a) or (909b). SC adapter (300) can accept SC connector (200). SC adapter (300) is secured within adapter (103) near its proximal end. LC adapter (325) can accept one or more LC connectors (225). LC adapter (325) is secured within adapter (103) near its proximal end. CS MPO adapter (330) can accept a MPO connector (230). MPO adapter (330) is secured within adapter (130) near its proximal end. CS adapter (335) can accept a CS connector (235). CS adapter (335) is secured within adapter (130) near its proximal end. SN adapter (340) can accept a SN connector 240. SN adapter (340) is secured within adapter (130) near its proximal end.

Figure 12:
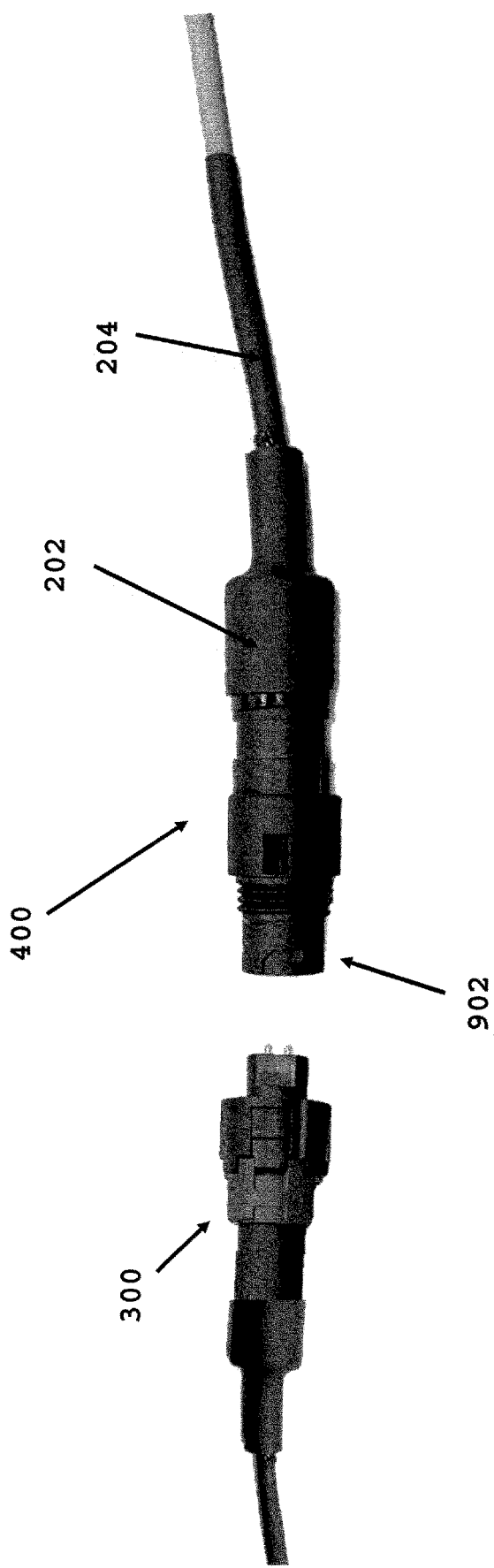
FIG. 12 is an exploded view of the present invention of FIG. 1 using heat shrink tubing instead of a cable gland.

FIG. 12 depicts an exploded view of the ingress protected adapter (400) according to FIG. 1, without a cable gland 105 but instead heat shrink tubing (202, 204). Tubing (204) seals a distal end of adapter (103) over tubing (202). Tubing (202) seals over cable jacket on to back post. Connector (102) connects to adapter (400).

Figures 13, 13A:
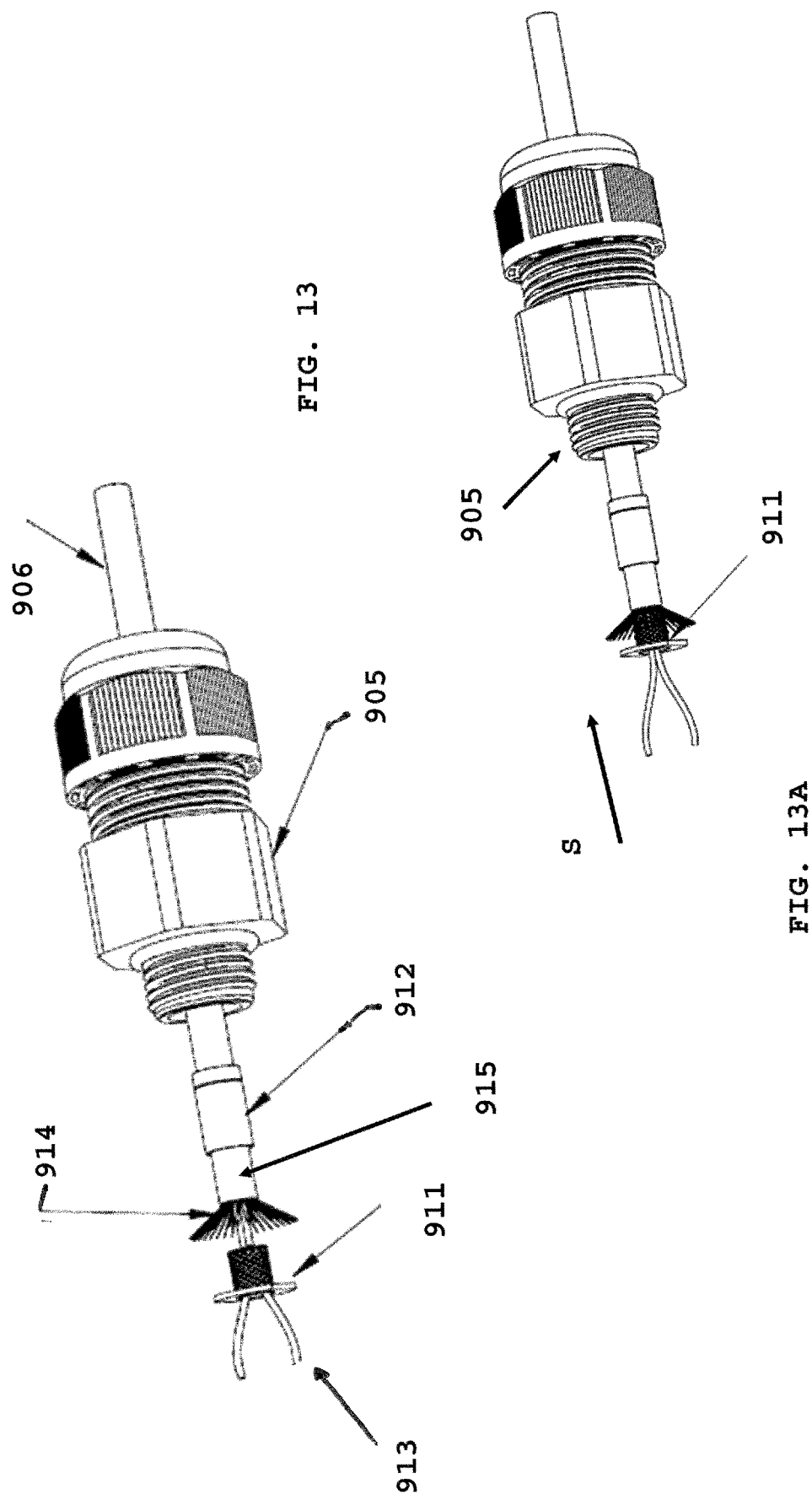
FIG. 13 is a perspective view of a cable gland assembly with back post exploded.
FIG. 13A is FIG. 13 with back post slid under strength members.
Figure 15:
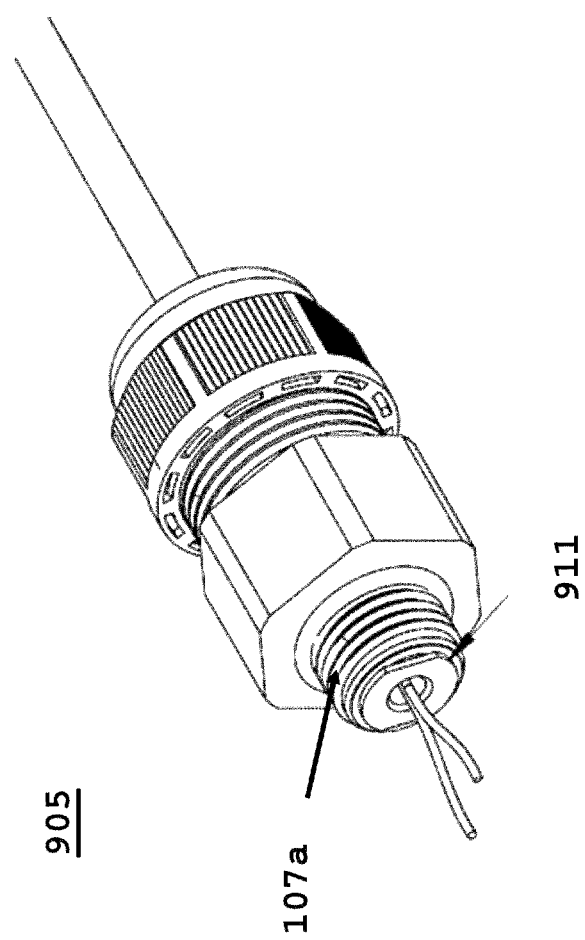
FIG. 15 is FIG. 13 fully assembled.

FIG. 13 depicts cable gland assembly (905) with fiber optic cable (906) through a bore. Crimp ring (912) is inserted over cable jacket (915), which was peeled back and cut-off to expose strength members (914). The strength members are made of Kevlar. Optical fibers (913) are passed through a bore in the knurled back post. The fibers are attached to the ferrule assembly. FIG. 13A depicts sliding back post (911) under the strength members in the direction of arrow "S". FIG. 14 depicts placing strength members (913) around a flange on back post (911). FIG. 14A depicts sliding crimp ring (912) over strength members and up against back post. FIG. 15 depicts final assembly of cable (906) secured with crimp ring (912) over strength member (914) and back post (911) abutting cable gland assembly (905).

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instance were a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. An ingress protected outdoor rated one-piece adapter comprising:
    an adapter body having a first end and a second end spaced apart from the first end along an axis, the second end being configured to secure a cable gland to the adapter body,
    the one-piece adapter body further comprises an internal thread at the second end, the thread being configured to accept a cable gland nut formed as part of the cable gland assembly, wherein securing the cable gland assembly to the one-piece adapter body forms an environmental seal at the second end about a cable;
    a fiber optic adapter positioned within the one-piece adapter body, the fiber optic adapter is configured to accept a fiber optic connector at a first end, and further wherein the fiber optic adapter at a second end is configured to receive at least one optical fiber from the cable secured within the cable gland assembly from the second end; and wherein the one-piece adapter body comprises a front portion at a first end configured to accept and secure an outdoor rated connector including at least one fiber optic connector selected from one of the following a LC, SC, SN, CS or MPO type fiber optic connector for mating with the fiber optic adapter;
    wherein the one-piece adapter body is formed from a single monolithic piece of material; and
    wherein the internal thread is disposed on an inner wall of the one-piece adapter body that faces radially inward toward the axis;
    wherein the adapter front portion is configured to accept a bayonet-style second connector.

2. The ingress protected outdoor rated one-piece adapter according to claim 1, wherein the fiber optic adapter further comprises at least one latch, and further wherein the one-piece adapter body has a receiving surface to accept and lock the fiber optic adapter within one-piece adapter body.

3. The ingress protected outdoor rated one-piece adapter according to claim 1, wherein the one-piece adapter body front portion further comprises a locking groove on an outer surface of the one-piece adapter body front portion and a locking groove pin in the locking groove, the locking groove is configured to accept the outdoor rated connector and secure the outdoor rated connector using the locking groove pin.

4. An ingress protected outdoor rated one-piece adapter comprising:
    an adapter body having a first end and a second end spaced apart from the first end along an axis, the second end being configured to secure a cable gland to the adapter body,
    the one-piece adapter body further comprises an internal thread at the second end, the thread being configured to accept a cable gland nut formed as part of the cable gland assembly, wherein securing the cable gland assembly to the one-piece adapter body forms an environmental seal at the second end about a cable;
    a fiber optic adapter positioned within the one-piece adapter body, the fiber optic adapter is configured to accept a fiber optic connector at a first end, and further wherein the fiber optic adapter at a second end is configured to receive at least one optical fiber from the cable secured within the cable gland assembly from the second end; and wherein the one-piece adapter body comprises a front portion at a first end configured to accept and secure an outdoor rated connector including at least one fiber optic connector selected from one of the following a LC, SC, SN, CS or MPO type fiber optic connector for mating with the fiber optic adapter;
    wherein the one-piece adapter body is formed from a single monolithic piece of material; and
    wherein the internal thread is disposed on an inner wall of the one-piece adapter body that faces radially inward toward the axis;
    wherein the one-piece adapter body front portion further comprises a locking groove on an outer surface of the one-piece adapter body front portion and a locking groove pin in the locking groove, the locking groove is configured to accept the outdoor rated connector and secure the outdoor rated connector using the locking groove pin.

5. An ingress protected outdoor rated adapter comprising:
    a one-piece adapter body having a first end portion and a second end portion spaced apart along an axis,
    the one-piece adapter body being formed from a single monolithic piece of material,
    the one-piece adapter body comprising a generally annular wall extending from the first end portion to the second end portion and defining an interior of the one-piece adapter body,
    the first end portion of the one-piece adapter body defining an outdoor rated connector interface configured to accept and secure an outdoor rated connector that includes an outdoor connector housing and an indoor connector plug body received in the outdoor connector housing,
    the second end portion of the one-piece adapter body including an integral thread configured to threadably couple to a threaded component of a cable gland assembly such that the cable gland assembly can provide a seal between the second end portion of the one-piece adapter body and an optical fiber cable terminated by an indoor fiber optic plug termination, the generally annular wall being configured to retain an indoor fiber optic adapter in the interior of the one-piece adapter body such that (i) the indoor connector plug body can plug into a first receptacle of the indoor fiber optic adapter when the outdoor rated connector is accepted and secured by the outdoor rated connector interface of the one-piece adapter body and (ii) the indoor fiber optic plug termination can plug into a second receptacle of the indoor fiber optic adapter opposite the first receptacle when the cable gland assembly provides a seal between the second end portion of the one-piece adapter body and the optical fiber cable, whereby the one-piece adapter body makes an ingress-protected optical connection of the outdoor rated optical connector to the optical fiber cable;

wherein the outdoor connector is a bayonet-style outdoor connector and the outdoor rated connector interface is configured to accept the bayonet-style outdoor connector.

\* \* \* \* \*